United States Patent Office 2,819,260
Patented Jan. 7, 1958

2,819,260
PROCESS FOR PREPARING OXYALKYLATED DERIVATIVES

Louis T. Monson, Puente, and Woodrow J. Dickson, Monterey Park, Calif., assignors to Petrolite Corporation, Los Angeles, Calif., a corporation of Delaware No Drawing. Application June 4, 1953
Serial No. 359,662

6 Claims. (Cl. 260—209)

This invention relates to the preparation of substantially anhydrous and substantially undiluted oxyalkylated derivatives of a particular class of oxyalkylation-susceptible organic compounds which, because of certain characteristics they possess, are not otherwise oxyalkylatable to produce such derivatives.

Oxyalkylation-susceptible organic compounds are characterized by their possession of labile hydrogen atoms, i. e., hydrogen atoms attached to oxygen, nitrogen, or sulfur. Their oxyalkylation may proceed with greater or lesser readiness; but oxyalkylated derivatives can be prepared from them.

The oxyalkylating agents conventionally employed to produce oxyalkylated derivatives are the lower alkylene oxides, ethylene oxide, propylene oxide, butylene oxide, glycid, and methylglycid. These may be defined as alpha-beta alkylene oxides containing four carbon atoms or less. They may be employed singly, in sequence, or in admixture.

Unfortunately, there are some situations, like those with which this invention is concerned, in which the employment of such conventional oxyalkylating agents is not practicable. Some starting materials, although inherently oxyalkylation-susceptible, are solids which are substantially insoluble in any of the oxyalkylation-resistant solvents available for use in the preparation of oxyalkylated derivatives.

For example, many oxyalkylation-susceptible solids are insoluble in xylene, which is a frequently used solvent in oxyalkylation procedures. Xylene is oxyalkylation-resistant and is readily separable from the oxyalkylation mass by simple distillation.

Furthermore, even though such starting materials may be soluble in a few unusual oxyalkylation-resistant solvents, the latter are themselves comparatively nonvolatile. Various ethers might in some cases be considered suitable solvents for the oxyalkylation-susceptible solid starting material. Such ethers, like the diethers of the polyglycols, in addition to being expensive, are not susceptible to easy separation from the oxyalkylation mass by distillation. Hence, they are not readily recoverable from the oxyalkylation mass by distillation, to leave an undiluted oxyalkylated derivative.

Some solids which are oxyalkylation-susceptible are in fact most soluble in water; but water is not an acceptable solvent for use in oxyalkylation processes employing the conventionally used alkylene oxides because it reacts with such alkylene oxides to produce polyglycols, during oxyalkylation.

We are aware that it has been proposed in the past to conduct oxyalkylations using the conventional alkylene oxides in aqueous solutions, presumably on the assumption that the oxide did not react with the water. However, it is now established that such reaction with the water occurs to some extent. The oxyalkylated mass produced in such aqueous systems therefore contains varying proportions of alkylene glycols as contaminants or adulterants. Our process avoids this difficulty because it is conducted under substantially anhydrous conditions in all cases. The starting solid material, the catalyst, and the alkylene carbonates employed by us are all used in substantially anhydrous form.

Furthermore, many oxyalkylation-susceptible solids cannot be used in undiluted form in an oxyalkylation process using the alkylene oxides, and simply liquefied by heating prior to introduction of the oxyalkylating agent, because they undergo partial decomposition as they melt. If maintained at the temperature at which fusion just begins to be apparent, for a time such as 15 minutes, they undergo at least partial decomposition. If they exhibit such behavior in the presence of an oxyalkylation catalyst, like the alkali carbonates, they come within our class of suitable starting materials for use in our present process.

The foregoing statement of difficulties is applicable to greater or lesser extent to a number of oxyalkylation-susceptible compounds, including those recited below. The alkylene oxides are not usable for their oxyalkylation for the above stated reasons.

Our present invention overcomes such difficulties and permits oxyalkylation of such materials to be accomplished by simple and inexpensive means. Thus, we employ as primary oxyalkylating agents the carbonates which are the counterparts of the foregoing alkylene oxides, viz., ethylene carbonate, propylene carbonate, butylene carbonate, hydroxypropylene carbonate, and hydroxybutylene carbonate. Of these, only ethylene carbonate and propylene carbonate are currently in commercial production, although the others will doubtless achieve similar commercial status in time.

More specifically, our invention relates to a two-step process for preparing substantially anhydrous, substantially undiluted oxyalkylated derivatives from an anhydrous, solid, oxyalkylation-susceptible disaccharide, which solid suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said solid with at least one alkylene carbonate selected from the class consisting of ethylene carbonate, propylene carbonate, butylene carbonate, hydroxypropylene carbonate, and hydroxybutylene carbonate, in presence of an oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid; and (B) substantially reacting such partially oxyalkylated derivative with at least one member selected from the aforesaid class of alkylene oxides.

Briefly described, our process is practiced by introducing into a suitable processing vessel the solid, oxyalkylation-susceptible disaccharide, preferably in finely divided form; the desired or required proportion of alkylene carbonate; and a minor proportion of an alkaline catalyst such as an alkali carbonate. The mixture is warmed, preferably with stirring. As the temperature reaches a certain critical level, usually somewhat above 100° C., there is a vigorous effervescence in which carbon dioxide is liberated, and the oxyalkylated derivative is formed.

It is sometimes desirable to modify this general procedure in various minor ways. For example, the alkylene carbonate is introduced into a vessel and warmed until liquid. The catalyst is added. The solid, oxyalkylation-susceptible disaccharide material is then slowly introduced in finely divided form, with stirring, and the temperature is slowly raised to the reaction point. Such procedural variation is useful where the oxyalkylation-susceptibility of the starting material is not great and where use of the first-described procedure above would produce a solid mass in the vessel which could not be readily handled thereafter.

In our process, we usually employ only enough alkylene carbonate in the first step to produce a liquid or readily liquefiable derivative, which contains a relatively small proportion of oxyalkylene radicals. We then continue oxyalkylation using the conventional alkylene oxides. Stated another way, this two-step process is employed to produce, first, intermediates; then more highly oxyalkylated products are prepared in the second step using the more economical, conventional alkylene oxides.

In the appended claims, we have specified that the intermediate product prepared in the first step of the two-step process shall be a liquid or at least liquefiable at the temperature required to effect the oxyalkylation by use of the alkylene oxides in the second step of our process. Said second step is conducted at conventional oxyalkylation temperatures, usually between about 100° C. and 200° C.

One incidental advantage of using the alkylene carbonates for oxyalkylation is that they are relatively inert materials as compared with the alkylene oxides. Their use therefore entails smaller hazards. Oxyalkylations using them are conducted with greater safety than if the alkylene oxides were employed. Processing vessels are usually not required to be pressure-resistant when the alkylene carbonates are employed, whereas ethylene oxide and propylene oxide, for example, are required to be employed in pressure vessels because of their physical properties.

All oxyalkylation-susceptible disaccharide starting materials do not react with equal readiness with the alkylene carbonates in our process. For example, where steric or other obscure influences are adverse, oxyalkylation may proceed at extremely slow rates.

The temperature at which the oxyalkylation reaction will occur, using the alkylene carbonates, must be expected to vary somewhat with the choice of disaccharide starting material and alkylene carbonate. In all cases, the proper technique to be initially employed is to advance the temperature cautiously and so to determine the minimum temperature required to effect reaction. This procedure requires no especial skill and no experimentation, in that the vigorous effervescence resulting from the liberation of carbon dioxide in the reaction is ready evidence of such reaction. As stated above, the reaction usually requires a temperature somewhat above 100° C. The maximum feasible oxyalkylation temperature is of course the decomposition temperature for the mixture of solid starting material, catalyst, and alkylene carbonate, and above which temperature pyrolysis of the starting material, polymerization of the alkylene carbonate, or other undesired reaction begins to occur.

The oxyalkylation catalysts employed by us are usually the alkali carbonates such as sodium or potassium carbonate, in substantially anhydrous form.

The finished oxyalkylated product will of course contain such inorganic catalyst. The catalyst will usually separate readily from the oxyalkylated mass on standing, especially if slightly warm. Since the residual proportions of catalyst in the supernatant product are usually of very small magnitude after such settling, we consider they do not materially dilute or contaminate our finished products.

In some instances, solid, oxyalkylation-susceptible substances, which may have been stated in the literature to have definite melting points, are nevertheless susceptible to progressive decomposition if maintained at or about the temperature at which they begin to fuse, for any period of time. Some such substances similarly undergo progressive deterioration if subjected to such temperatures in the presence of an alkaline material, like an oxyalkylation catalyst, for any period of time. Disaccharides which, although they may have recorded definite melting points, are unstable under oxyalkylating conditions as described, are included among our usable starting materials.

We have therefore limited our usable disaccharide starting materials to those which suffer at least partial decomposition if maintained at their beginning-of-fusion temperature for a period of at least 15 minutes in the presence of an oxyalkylation catalyst. Additionally, such solid disaccharide starting material must be insoluable in oxyalkylation-resistant, distillation-separable solvents, as already stated.

As the molecular weight of the alkylene carbonate rises, its reactivity with the disaccharide starting materials is reduced. Since, for example, ethylene carbonate is more reactive than propylene carbonate, and propylene carbonate is more reactive than butylene carbonate, there may be marked differences in the speed of oxyalkylation when different alkylene carbonates are used. In marginal cases, it will be understood, a disaccharide starting material may be oxyalkylation-susceptible in the sense that it is readily reactive toward ethylene carbonate or propylene carbonate, but it may be rather insensitive toward butylene carbonate.

Our process may be practiced using more than one alkylene carbonate, and in addition, more than one alkylene oxide, to produce mixed oxyalkylated derivatives. In such cases, the alkylene carbonates may be employed in sequence or they may be employed as a mixture, as desired. The same is true of the alkylene oxides employed in our two-step process, which may be used in sequence or as a mixture.

Disaccharides included in our present class of starting materials are sucrose, maltose, lactose, cellobiose, and gentiobiose, among others. For example, sucrose is well-known to decompose or caramelize on melting at about 189° C.; maltose melts with decomposition at about 102° C.; lactose loses a molecule of water at 140° C. and melts with decomposition at 205° C.; cellobiose melts with decomposition at 225° C.; and gentiobiose melts with decomposition at about 190° C. All are oxyalkylation-susceptible.

As examples of our process, in which the foregoing starting materials are usable, the following are typical but not exclusive.

In all cases, the apparatus employed to produce the products in the laboratory was a conventional resin pot assembly, fitted with a stirrer. This is a glass apparatus comprising a lower bowl or vessel, and an upper cap section containing several outlets, for the stirrer shaft, a thermometer, and a reflux condenser, and a charge hole fitted with a stopper. The design is conventional and need not be described further. Heat is supplied by a glass-textile heating mantle which fits the lower portion of the assembly, and which is regulated by inclusion of a rheostat in the electrical circuit. Such devices are likewise wholly conventional, and require no description here. Motor-driven stirrers, of the kind here used, and having stainless-steel or glass shafts and paddles, are likewise conventional laboratory equipment.

*Example 1*

We charged into a glass resin pot assembly 276 grams of sucrose (domestic grade sugar), 365 grams of ethylene carbonate, and 6 grams of powdered potassium carbonate. The mixture was heated, with stirring, to about 156–170° C. and held in that temperature range for an hour, stirring continuing. The originally grainy slurry began to foam and clear, after about 30 minutes. The final product, after the foam subsided, was a clear, bright, dark, viscous liquid.

Example 2

We charged into a conventional oxyalkylating autoclave 500 grams of the product of Example 1. This was warmed to 120° C. and 7 grams of sodium hydroxide were added. Then, we introduced a total of 520 grams of ethylene oxide, over a period of 1.5 hours, the maximum pressure being 40 p. s. i. Then we introduced, at the same temperature, a total of 1,550 grams of propylene oxide, over a period of 3.5 hours, the maximum pressure being 55 p. s. i. The product was a viscous brown liquid.

Example 3

We charged into a glass resin pot assembly 342 grams of sucrose (domestic grade sugar), 704 grams of ethylene carbonate, and 6 grams of powdered potassium carbonate. The temperature was raised to 155–165° C. in about 1 hour, with stirring. Foaming began after about 15 minutes of heating, and subsided substantially after about 1 hour. Heating at that temperature, with stirring, for a period of 1.5 hours produced a dark, viscous liquid.

Example 4

We charged into a glass resin pot assembly 85 grams of sucrose (domestic grade sugar), 400 grams of propylene carbonate, and 10 grams of powdered sodium carbonate. The mixture was heated, with stirring, to about 165° C., and maintained at this temperature, with stirring, for 5.2 hours. At that time, it was clear and bright, and much gas had been evolved. On cooling, approximately 40% of the product became solid. Heating to about 120° C. re-liquefied the product.

Example 5

We have repeated Example 3, but substituting for the ethylene carbonate 930 grams of butylene carbonate. The reaction was continued for 3 hours, instead of 1.5 hours. The product was a dark, viscous liquid.

Example 6

We have repeated Example 3, but substituting for the ethylene carbonate 950 grams of hydroxypropylene carbonate. The reaction was continued for 3 hours, instead of 1.5 hours. The product was a dark, viscous liquid.

Example 7

We have repeated Example 3, but substituting for the ethylene carbonate 1,065 grams of hydroxybutylene carbonate. The reaction was continued for 3.5 hours, instead of 1.5 hours. The product was a dark, viscous liquid.

Example 8

We have repeated Example 2, but have not employed the propylene oxide there used, using instead only the 520 grams of ethylene oxide there employed.

Example 9

We have repeated Example 2, but have omitted the use of the ethylene oxide there employed, using only the 1,550 grams of propylene oxide shown in that example.

Example 10

We have repeated Example 3, but instead of using 704 grams of ethylene carbonate, we have employed a mixture of 352 grams of ethylene carbonate and 408 grams of propylene carbonate.

Example 11

We have transferred the product of Example 10 to a conventional oxyalkylating autoclave and after adding 7 grams of sodium hydroxide, have introduced a mixture of 220 grams of ethylene oxide and 580 grams of propylene oxide, maintaining the temperature at about 120–130° C., for some 6 hours. The product was a brown, viscous liquid.

Example 12

We have repeated Examples 1–11, but substituting an equal weight of anhydrous maltose for the sucrose there used. Since maltose decomposes at about 102° C. instead of at about 189° C., all reaction temperatures were maintained below 100° C. in the maltose preparation procedures. The times were required to be extended to from 3 to five times those used in the sucrose reactions.

Example 13

We have repeated Examples 1–11, but substituting an equal weight of anhydrous lactose for the sucrose there used. Lactose ordinarily includes a mole of water of crystallization, which is lost at about 140° C. We have therefore employed hydrated lactose, but have warmed it to approximately 150° C. for sufficient time to volatilize such water of crystallization before beginning the preparation of derivatives from it. Since lactose decomposes at about 205° C., the same temperatures employed with sucrose were used in the lactose preparation procedures, and the reaction times were approximately the same as those for sucrose.

Example 14

We have repeated Examples 1–11, but substituting an equal weight of cellobiose for the sucrose there used. Cellobiose decomposes at about 225° C., so the same temperatures and reaction times were used for it as were used for sucrose.

Example 15

We have repeated Example 1–11, but substituting an equal weight of gentiobiose for the sucrose there used. Gentiobiose decomposes at about 190° C., so the same temperatures and reaction times were used for it as were used for sucrose.

The products of our processes find a number of uses. Where the level of oxyalkylation is relatively high, they are markedly surface-active, and hence are usable where low-surface-tension solutions are useful, as in wetting, dispersing, and emulsifying operations. They are sometimes useful in demulsifying processes, in which oil and water are separated from their emulsions, and particularly crude oil and oil-field waters. They are useful in biochemical and biological work in some cases.

We claim:

1. A two-step process for preparing substantially anhydrous, substantially undiluted oxyalkylated derivatives from an anhydrous, solid, oxyalkylation-susceptible disaccharide, which solid suffers at least partial decomposition if maintained at its beginning-of-fusion temperature for a period of at least 15 minutes in the presence of an oxyalkylation catalyst, and which solid is insoluble in oxyalkylation-resistant, distillation-separable solvents; which process consists in: (A) first reacting said anhydrous solid with at least one anhydrous alkylene carbonate selected from the class consisting of ethylene carbonate, propylene carbonate, butylene carbonate, hydroxypropylene carbonate, and hydroxybutylene carbonate, in the presence of an anhydrous alkaline oxyalkylation catalyst; the proportion of alkylene carbonate employed being sufficient to yield a product which is at least liquefiable at the temperature required to effect its subsequent oxyalkylation using at least one alkylene oxide selected from the class consisting of ethylene oxide, propylene oxide, butylene oxide, glycid, and methylglycid; and (B) subsequently reacting such partially oxyalkylated derivative with at least one anhydrous alkylene oxide selected from the aforesaid class of alkylene oxides.

2. The process of claim 1, wherein the oxyalkylation-susceptible starting material is sucrose.

3. The process of claim 1, wherein the oxyalkylation-susceptible starting material is maltose.

4. The process of claim 1, wherein the oxyalkylation-susceptible starting material is lactose.

5. The process of claim 1, wherein the oxyalkylation-susceptible starting material is cellobiose.

6. The process of claim 1, wherein the oxyalkylation-susceptible starting material is gentiobiose.

References Cited in the file of this patent

UNITED STATES PATENTS

| | | |
|---|---|---|
| 2,448,767 | Carlson | Sept. 7, 1948 |
| 2,552,528 | De Groote | May 15, 1951 |
| 2,574,545 | De Groote | Nov. 12, 1951 |

OTHER REFERENCES

Pigman: "Chemistry of the Carbohydrates," published by Academic Press (N. Y.), 1948; pages 556–7 relied on.